United States Patent Office 3,654,302
Patented Apr. 4, 1972

3,654,302
TETRAHYDROPHTHALANILS
Herbert Schwartz, 1963 N. Maurice River Parkway, Vineland, N.J. 08360, and Joseph B. Skaptason, 12700 Prospect Ave., Rte. 30, Kansas City, Mo. 64146
No Drawing. Continuation-in-part of application Ser. No. 539,266, Apr. 1, 1966, now Patent No. 3,507,904. This application Jan. 30, 1970, Ser. No. 7,223
Int. Cl. C07d 27/52
U.S. Cl. 260—326
17 Claims

ABSTRACT OF THE DISCLOSURE

Tetrahydrophthalanils of the formula

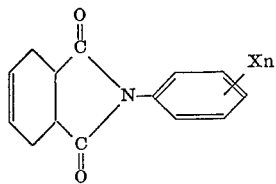

wherein X is at least one member of the group consisting of halogen, lower alkyl and lower alkoxy of 1 to 7 carbon atoms, halogenated lower alkyl of 1 to 7 carbon atoms, sulfamoyl, lower alkylenedioxy of 1 to 4 carbon atoms and

wherein R and $R_1$ are selected from the group consisting of hydrogen and lower alkyl of 1 to 7 carbon atoms and $n$ is an integer of 1 to 5 which compounds possess interesting pesticidal herbicidal activities.

PRIOR APPLICATION

The present application is a continuation-in-part of our copending U.S. patent application Ser. No. 539,266 filed Apr. 1, 1966 and now U.S. Pat. No. 3,507,904.

OBJECTS OF THE INVENTION

It is an object of the invention to provide novel tetrahydrophthalanils of Formula I.

It is another object of the invention to provide novel pesticidal compositions.

These and other objects and advantages of the invention will become obvious from the following detailed description.

THE INVENTION

The novel tetrahydrophthalanils of the invention have the formula

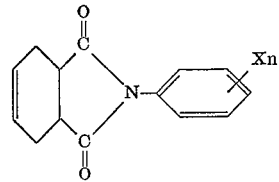

wherein X is at least one member of the group consisting of halogen, lower alkyl and lower alkoxy of 1 to 7 carbon atoms, halogenated lower alkyl of 1 to 7 carbon atoms, sulfamoyl, lower alkylenedioxy of 1 to 4 carbon atoms and

wherein R and $R_1$ are selected from the group consisting of hydrogen and lower alkyl of 1 to 7 carbon atoms and $n$ is an integer of 1 to 5. Preferably $n$ is an integer from 1 to 3.

The novel compounds of the invention may be made by known procedures. Tetrahydrophthalanilic acid anhydride which is a Diels-Alder adduct of butadiene and maleic acid anhydride is reacted with the desired substituted aniline in an organic solvent and the resulting tetrahydrophthalanilic acid is then dehydrated to the desired imide form. The lower alkyl esters of the resulting tetrahydrophthalanilic acid can be thermally decomposed to the said imide form.

Examples of substituted anilines used to prepare the novel compounds of the invention are halogenated anilines such as 4 - bromoaniline, 4 - chloroaniline, 4-fluoroaniline, 3 - iodoaniline, 3 - chloroaniline, 3,4 - dichloroaniline, 2,4-dichloroaniline; alkylated anilines such as 3-methylaniline, 4-methylaniline, 4 - butylaniline, 4 - tert. butylaniline; 3,4-methylenedioxyaniline; halogenated alkylanilines such as 3 - trifluoromethylaniline, 4 - chloroethylaniline, 4-chloromethylaniline; sulfamoylanilines such as 4-sulfamoylaniline; amino-anilines such as 4-dimethylaminoaniline; and anilines having different substituents such as 3-chloro-4-methylaniline, 2-methyl-4-bromoaniline, 4-chloro-3-trifluoromethylaniline, 2-methoxy-5-chloro-aniline, 3 - trifluoromethyl-4-amino-aniline, 3-trifluoromethyl-4-dimethylaminoaniline, etc.

The novel compounds of the invention are excellent herbicides, mildewcides, fungicides and insecticides and may be formulated in various forms such as dusting preparations, solutions, emulsions, dispersions, aerosol sprays, etc. depending upon the desired use.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes or tetrahydronaphthalene, if desired, with the use of xylene mixtures, cyclohexanols, ketones, or chlorinated hydrocarbons, such as tetrachloroethane, trichloroethylene or tri- or tetrachlorobenzenes.

Aqueous prepartions suitable for application can be prepared by the addition of water to emulsion concentrates, pastes or wettable powders. As emulsifying or dispersing agents, there may be used non-ionic products, for example, condensation products of ethyleneoxide with aliphatic alcohols, amines or carboxylic acids containing a hydrocarbon radical having about 10 to 30 carbon atoms, such as condensation product of octadecyl alcohol with 25 to 30 molecular proportions of ethyleneoxide, or of soya bean fatty acid with 30 molecular proportions of ethyleneoxide or of commercial oleyamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or a mixture of these acids, or the sodium salt of petroleum-sulfonic acid. As cation-active dispersing agents there may be used quaternary ammonium compounds, such as cetyl-pyridinium bromide or di(hydroxyethyl)-benzyl-dodecylammonium chloride.

For making dusting or scattering preparations, there may be used as solid carriers talcum, kaolin, bentonite, calcium carbonate or calcium phosphate or carbon, cork meal or wood meal, or other materials of vegetable origin. The various preparations can be rendered more suitable for the various ways in which they are to be used by the known addition of substances which improve the dispersion, adhesiveness, resistance to rain or penetration capacity of the compositions. As such substances, there may be mentioned fatty acids, resins, glue, casein, or for example, alginates or the like.

For herbicidal use, the compounds of the invention may be used alone or in combination with other known herbicides such as dipyridylium salts such as 1,1'-ethylene-2,2'-bipyridylium dioxide (Diquat) and 1,1'-dimethyl-4,4'-bipyridylium di(methyl sulfate) (Paraquat); alkali metal and alkaline earth metal nitrate salts, such as sodium nitrate, calcium nitrate, etc.; herbicidal arsenical compounds such as mono-lower alkane-arsonic acids and lower dialkylarsinic acids such as methanearsonic acid, propane-arsonic acid, dibutylarsinic acid, dipropylarsinic acid, cacodylic acid, (hydroxydimethylarsine oxide), etc., and their alkali metal and alkaline earth metal salts such as monosodium methanearsonate, (MSMA), disodium methanearsonate, (DSMA), calcium hydrogen methanearsonate, and amine salts of the said arsonic acids where the amine is ethanolamine, diethanolamine, triethanolamine, isopropylamine, tri-isopropanolamine, mixtures of alkylamines having 8 to 14 carbon atoms, etc.

In the following examples, there are described several preferred embodiments to illustrate the invention. However, it should be understood that the invention is not intended to be limited to the specific embodiments.

EXAMPLE I

Preparation of 4'-sulfamoyltetrahydrophthalanil

A mixture of 1.5 g. of cis-$\Delta^4$-tetrahydrophthalic acid anhydride and 1.7 gm. of p-sulfanilamide were fused and then cooled to a solid. The said solid was recrystallized from a 1:1 mixture of butanol and pentanol to obtain 4'-sulfamoyltetrahydrophthalanil in the form of tan platelets having a melting point of 264° C. A nitrogen determination found 9.04% (theoretical—9.15%).

EXAMPLE II

Preparation of 3'-trifluoromethyltetrahydrophthalanil

Step A: 3'-trifluoromethyltetrahydrophthalanilic acid.—A hot solution of 10 g. of tetrahydrophthalic anhydride (Diels-Alder adduct of butadiene and maleic anhydride), was added with stirring to 10.6 of 3-trifluoromethylaniline in 100 ml. of benzene. After the two solutions had been thoroughly admixed, the reaction mixture was refluxed with stirring for one hour after which the solvent was removed by distillation. The residue was washed with aqueous hydrochloric acid to remove any unreacted aniline and then with water until the wash waters were neutral to obtain 20.5 gm. of crude product. The product was dried and recrystallized from aqueous methanol to obtain colorless needles of 3'-trifluoromethyltetrahydrophthalanilic acid having a melting point of 149 to 149.5° C. and a nitrogen content of 4.84% (theoretical—4.62%).

Step B: 3'-trifluoromethyltetrahydrophthalanil.—The 3'-trifluoromethyltetrahydrophthalanilic acid prepared in Step A was refluxed for one hour with acetyl chloride and excess acetyl chloride was then distilled off in vacuo. The residue after purification by recrystallization was 3'-trifluoromethyltetrahydrophthalanil having a melting point of 145–146° C., and a nitrogen content of 4.74% (theoretical—4.27%).

EXAMPLE III

Preparation of β'-bromotetrahydrophthalanil 5 g. of acetyl chloride were added to 8 g. of dry, crude 3'-bromotetrahydrophthalanilic acid and the mixture was gently refluxed for one hour after which the excess acetyl chloride was removed by evaporation in vacuo. A residue of 6.3 of crude 3'-bromotetrahydrophthalanil was obtained which upon recrystallization from aqueous methanol gave 5.2 g. of the said product in the form of colorless needles melting at 138.5 to 140° C. and containing a nitrogen content of 4.55% (theoretical—4.58%).

Using the same procedure, the following anils of formula were prepared:

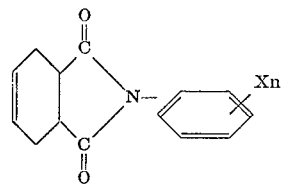

I

TABLE I

| Xn | Melting point (° C.) | Percent N Calc'd | Percent N Found |
|---|---|---|---|
| 3'-chloro | 135 | 5.36 | 5.38 |
| 4'-sulfamoyl | 264 | 9.15 | 9.18 |
| 3',4'-dichloro | 148 | 4.73 | 4.71 |
| 2',4'-dichloro | 104–105 | 4.73 | 4.81 |
| 3'-chloro-4'-methyl | 165–167 | 5.08 | 5.06 |
| 4'-trifluoromethyl | 180 | | |
| 3'-trifluoromethyl-4'-chloro | 152–153 | | |
| 4'-ethoxy | 94 | | |
| 4'-bromo | 155–156 | | |
| 4'-chloro | 147 | | |
| 4'-fluoro | 140 | | |
| 2'-methoxy-5'-chloro | 110–112 | | |
| 3'-trifluoromethyl-4'-dimethylamino | 121 | | |
| 3',4'-methylenedioxy | 146 | | |

EXAMPLE IV

Potted bean plants were sprayed with an acetone solution containing 100 p.p.m. of Triton X–100 as an emulsifier and 500 p.p.m. of the tetrahydrophthalanil and the plants were then subjected to heavy infection of early blight. The percentage of protection as compared to bean plants was then determined. 4'-fluorotetrahydrophthalanil gave 95% protection, 2',4'-dichlorotetrahydrophthalanil gave 60% protection, 4'-ethoxytetrahydrophthalanil gave 97% protection and 4'-trifluoromethyltetrahydrophthalanil gave 98% protection as did 3'-trifluoromethyl-4'-chlorotetrahydrophthalanil.

EXAMPLE V

The insecticidal activity on the confused flour beetle (*Tribolium confusum*), was determined by placing the beetles and larvae in 9.6 cm. petri dishes to which had been previously added one milliliter of acetone containing 5000 p.p.m. of the test compounds, and the acetone allowed to evaporate. After three days, the percent of mortality was determined and the results are summarized in Table II.

TABLE II

| Compound | Percent mortality after 3 days Adults | Percent mortality after 3 days Larvae |
|---|---|---|
| 4'-sulfamoyltetrahydrophthalanil | 85 | 100 |
| 3',4-dichlorotetrahydrophthalanil | 100 | 100 |
| Chlordane | 35 | |

Table II shows that the tetrahydrophthalanils of the invention are more effective against the confused flour beetle than the commercial insecticide, Chlordane.

EXAMPLE VI

General post-emergence herbicidal activity

To demonstrate the general herbicidal activity of the tetrahydrophthalmic compounds of the invention, compounds of the invention were applied to seven different plants according to the following procedure.

The compounds were prepared as 10% emulsion concentrates in two specific types of solvents as follows:

FORMULA F

Compound—10 percent by weight
Triton X-161—10 percent by weight
Solvent F—80 percent by weight

FORMULA 50 M

Compound—10 percent by weight
Triton X-161—10 percent by weight
Solvent 50 M—80 percent by volume TritonX-161 is a bend of anionic and nonionic alkyl aryl polyether alcohols and organic sulfonates. Solvent F is a 50:50 by volume mixture of diethylene glycol monobutyl ether acetate and Velsicol AR 50 (methylated naphthalenes). Solvent 50 M is a 20:80 by volume mixture of ethyl acetate and Velsicol AR 50. Before application, the concentrates were diluted to a concentration of 2000 p.p.m. of the compounds being tested.

The seven crops to be tested had been planted in flats 12 to 14 days before the tests and were well established seedlings. The plants were sprayed by a precision turntable technique in which 30 ml. of the spray solution (about 2.5 pounds per acre) was applied to each flat containing the seven crops. The plants were then kept under constant daily surveillance for a period of 7 to 14 days. The final phytotoxicity data were recorded at the end of 14 days and the plants were scored for phytotoxicity ratings on a scale from 0 (no injury to plants) to 10 (all the plants were killed). The results of the tests are summarized in Table III.

Other pre-emergence tests have shown 4'-chloro-tetrahydrophthalanil to be effective against tomatoes, pigweed, foxtail, morning glory and Johnson grass while being safe to cotton at 10 pounds per acre. In the same test, 4'-bromo-tetrahydrophthalanil was effective against tomatoes, pigweed, morning glory and Johnson grass while being safe to cotton. Another pre-emergence test showed 2',4'-dichloro-tetrahydrophthalanil to be effective against pigweed and foxtail while being safe to cotton and oats at 2½ pounds per acre.

3',4'-dichlorotetrahydrophthalanil in a pre-emergence test was effective against foxtail and tomatoes while being safe to oats and cotton at 10 pounds per acre. Also, 3'-trifluoromethyl-4'-chlorotetrahydrophthalanil shows good contact insecticidal activity (90% at 500 p.p.m.) against cabbage looper and 4'-trifluoromethyl tetrahydrophthalanil shows 60% control of a plant bacterial infection at a dose of 500 p.p.m.

Various modifications of the products and compositions of this invention may be made without departing from the spirit or scope thereof, and it is to be understood that the invention is to be limited only as defined in the appended claims.

We claim:

1. A tetrahydrophthalanils of the formula

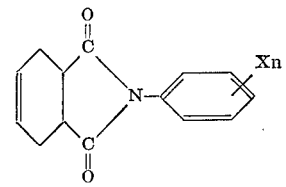

TABLE III

| Compound | Solvent | Phytotoxicity rating | | | | | | |
|---|---|---|---|---|---|---|---|---|
| | | Beets | Tomato | Radish | Flax | Johnson grass | Oats | Wheat |
| 2'4'-dichlorotetrahydrophthalanil | F | 0 | 5 | 5 | 10 | 9 | 8 | 4 |
| | 50 M | 5 | 9 | 9 | 10 | 9 | 9 | 5 |

EXAMPLE VI

The compounds in Table IV were formulated as 25% wettable powders and were applied to plants or to the soil in an aqueous carrier in a spray volume equal to 40 gallons per acre or 10 pounds of active ingredient per acre. The post- and pre-emergence ratings were taken 19 days later and compared with untreated control plants. The rating system was: 5=normal; 4=slight injury, 3= moderate in jury; 2=moderate-severe injury with plants not expected to recover; 1=severe and plants will not recover. Also determined was the percentage of kill. The results are shown in Table IV and V.

wherein X is at least one member of the group consisting of halogen, lower alkyl and lower alkoxy of 1 to 7 carbon atoms, halogenated lower alkyl of 1 to 7 carbon atoms, sulfamoyl, lower alkylenedioxy of 1 to 4 carbon atoms and

wherein R and $R_2$ are selected from the group consisting of hydrogen and lower alkyl of 1 to 7 carbon atoms and $n$ is an integer of 1 to 3.

TABLE IV.—POST-EMERGENCE

| Chemical | Coffeewd. | | Crabgr. | | Peas | | Barnydr. | | Cotton | | Rice | | Corn | | Pigweed | |
|---|---|---|---|---|---|---|---|---|---|---|---|---|---|---|---|---|
| | V. | Percent kill | V. | Percent kill | V. | Percent kill | V. | Percent kill | V. | Percent kill | V. | Percent kill | V. | Percent kill | V. | Percent kill |
| 4'-fluorotetrahydrophthalanil | 4 | 0 | 3 | 25 | 4 | 0 | 4 | 0 | 3 | 0 | 4 | 0 | 5 | 0 | 0 | 0 |
| 4'-chlorotetrahydrophthalanil | 5 | 0 | 3 | 25 | 3 | 0 | 5 | 0 | 5 | 0 | 5 | 0 | 5 | 0 | 0 | 100 |
| 4'-bromotetrahydrophthalanil | 4 | 0 | 3 | 30 | 2 | 0 | 5 | 0 | 5 | 0 | 5 | 0 | 5 | 0 | 0 | 100 |
| Check | 5 | 0 | 5 | 0 | 5 | 0 | 5 | 0 | 5 | 0 | 5 | 0 | 5 | 0 | 5 | 0 |

TABLE V.—PRE-EMERGENCE

| Chemical | Coffeewd. | | Crabgr. | | Peas | | Barnydr. | | Cotton | | Rice | | Corn | | Pigweed | |
|---|---|---|---|---|---|---|---|---|---|---|---|---|---|---|---|---|
| | V. | Percent kill | V. | Percent kill | V. | Percent kill | V. | Percent kill | V. | Percent kill | V. | Percent kill | V. | Percent kill | V. | Percent kill |
| 4'-fluorotetrahydrophthalanil | 5 | 0 | 5 | 0 | 4 | 0 | 4 | 0 | 5 | 0 | 5 | 0 | 5 | 0 | 0 | 100 |
| 4'-chlorotetrahydrophthalanil | 5 | 0 | 3 | 80 | 3 | 0 | 4 | 0 | 5 | 0 | 5 | 0 | 5 | 0 | 0 | 100 |
| 4'-bromotetrahydrophthalanil | 3 | 0 | 0 | 100 | 3 | 0 | 4 | 0 | 5 | 0 | 3 | 0 | 5 | 0 | 0 | 100 |
| Check | 5 | 0 | 5 | 0 | 5 | 0 | 5 | 0 | 5 | 0 | 5 | 0 | 5 | 0 | 5 | 0 |

2. A compound of claim 1 which is 4'-fluorotetrahydrophthalanil.

3. A compound of claim 1 which is 4'-chlorotetrahydrophthalanil.

4. A compound of claim 1 which is 4'-bromotetrahydrophthalanil.

5. A compound of claim 1 which is 4'-sulfamoyltetrahydrophthalanil.

6. A compound of claim 1 which is 3'-trifluoromethyltetrahydrophthalanil.

7. A compound of claim 1 which is 3'-bromotetrahydrophthalanil.

8. A compound of claim 1 which is 3'-chlorotetrahydrophthalanil.

9. A compound of claim 1 which is 3',4-dichlorotetrahydrophthalanil.

10. A compound of claim 1 which is 2',4'-dichlorotetrahydrophthalanil.

11. A compound of claim 1 which is 3'-chloro-4'-methyltetrahydrophthalanil.

12. A compound of claim 1 where is 4'-trifluoromethyltetrahydrophthalanil.

13. A compound of claim 1 which is 3'-trifluoromethyl-4'-chlorotetrahydrophthalanil.

14. A compound of claim 1 which is 4'-ethoxytetrahydrophthalanil.

15. A compound of claim 1 which is 2'-methoxy-5'-chlorotetrahydrophthalanil.

16. A compound of claim 1 which is 3'-trifluoromethyl-4'-dimethylaminotetrahydrophthalanil.

17. A compound of claim 1 which is 3',4-methylenedioxytetrahydrophthalanil.

References Cited

UNITED STATES PATENTS 3,123,461   3/1964   Gottesman _____ 260—326 X

ALEX MAZEL, Primary Examiner

J. A. NARCAVAGE, Assistant Examiner

U.S. Cl. X.R.

71—95; 260—326 N, 326 A, 326 HL; 424—274